H. I. HAWXHURST.
WINDMILL.
APPLICATION FILED NOV. 22, 1909.

965,387.

Patented July 26, 1910.

2 SHEETS—SHEET 1.

Witnesses.

Inventor,
Henry I. Hawxhurst,
By
Attorney.

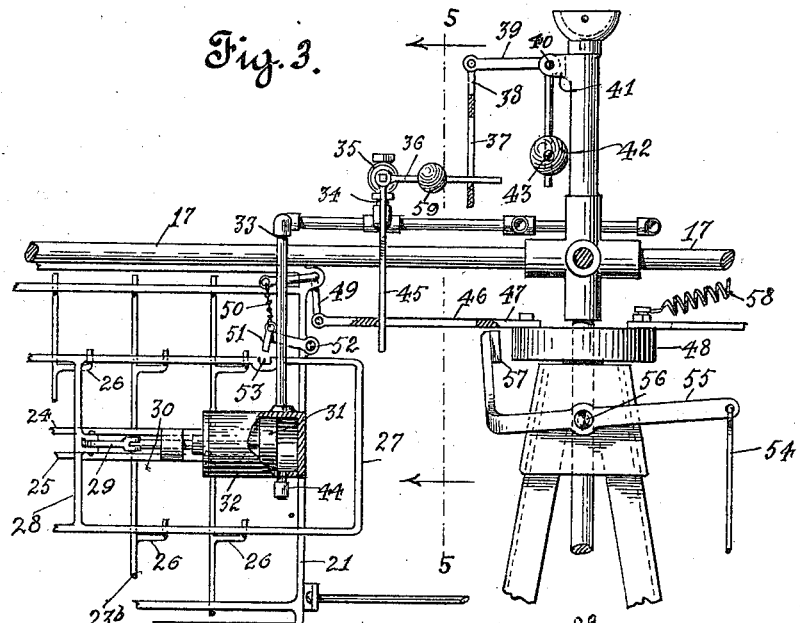
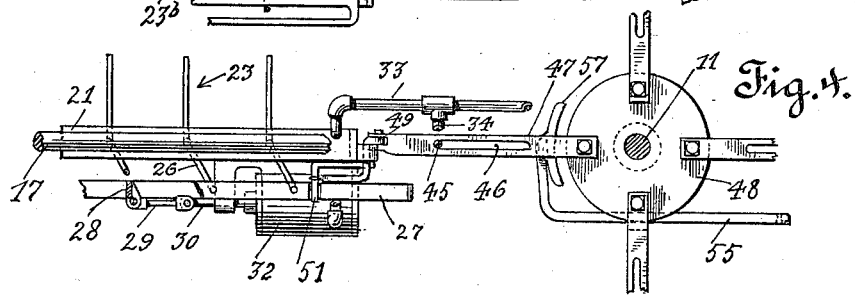
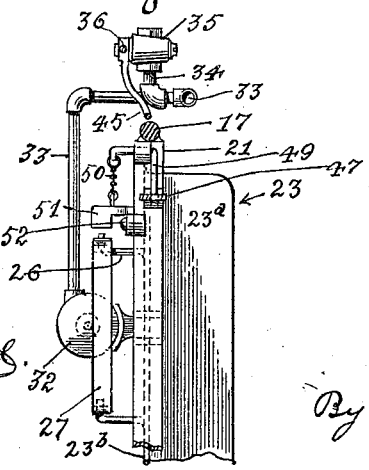

UNITED STATES PATENT OFFICE.

HENRY I. HAWXHURST, OF LOS ANGELES, CALIFORNIA, ASSIGNOR TO HAWXHURST WIND TURBINE POWER COMPANY, OF LOS ANGELES, CALIFORNIA, A CORPORATION OF CALIFORNIA.

WINDMILL.

965,387.  Specification of Letters Patent.  Patented July 26, 1910.

Application filed November 22, 1909. Serial No. 529,276.

*To all whom it may concern:*

Be it known that I, HENRY I. HAWXHURST, a citizen of the United States, residing in the city of Los Angeles, county of Los Angeles, State of California, have invented new and useful Improvements in Windmills, of which the following is a specification.

My invention relates to that class of wind mills in which a plurality of parallel vanes are mounted on a rotating arm and together with the arm constitute one of the wings of the mill, and the object thereof is to produce a wind mill of great power; of simple construction which is self regulating, and requires but little attention in its operation.

Figure 1:
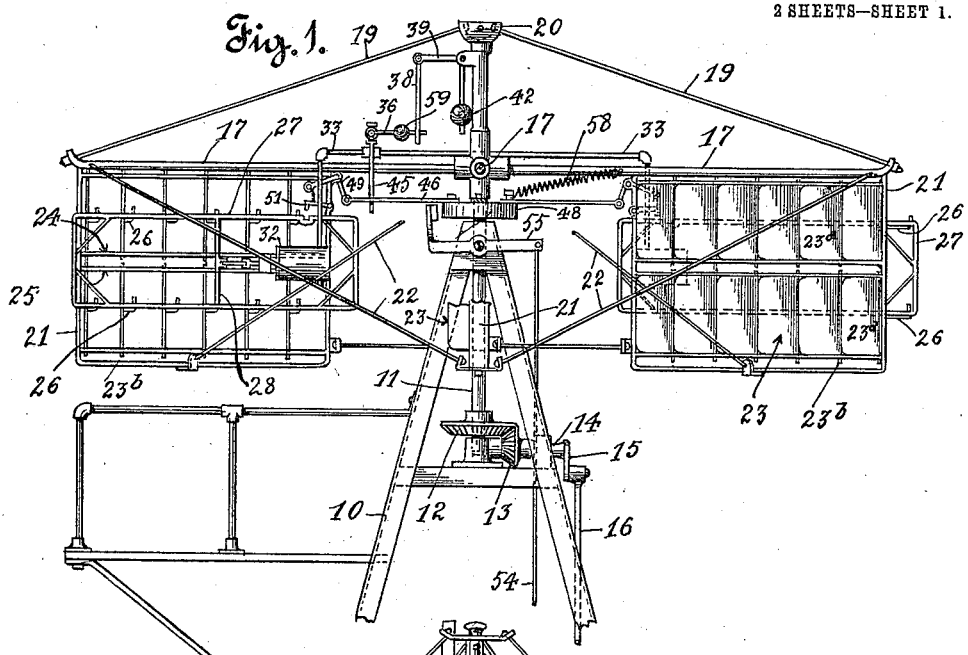
Figure 2:
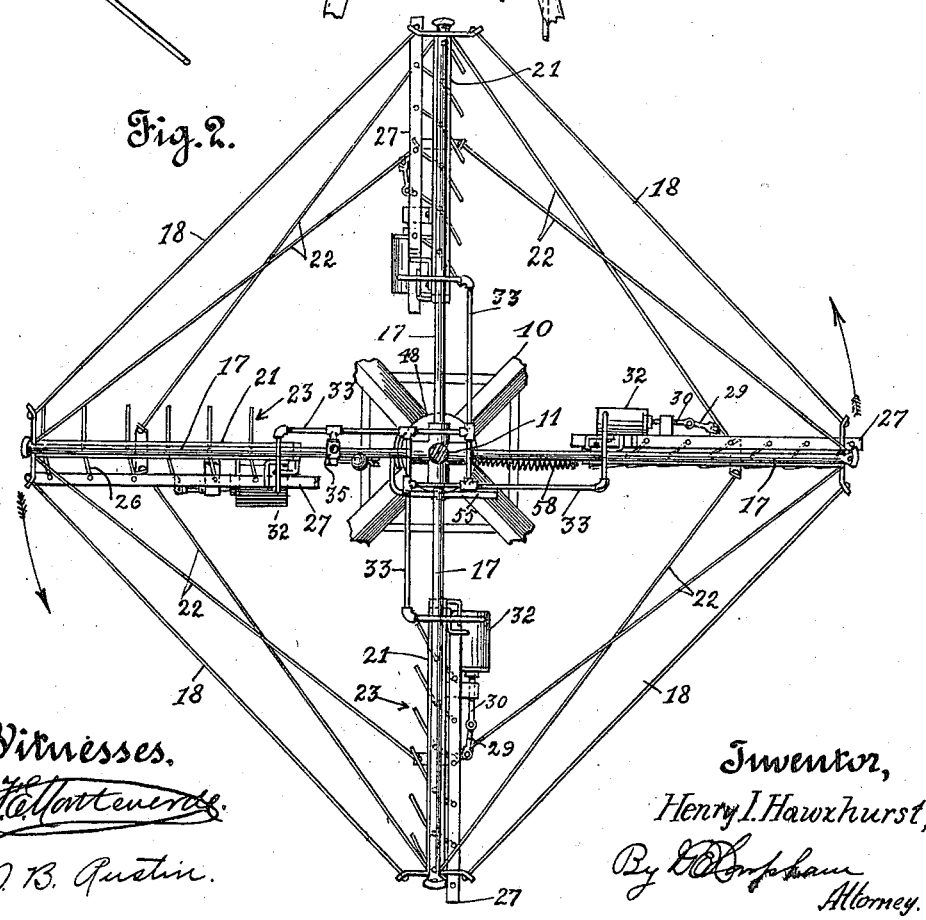

I accomplish these objects by the mill described herein and illustrated in the accompanying drawings in which;

Figure 1 is a side elevation of the upper portion of my improved wind mill with a part of the wings removed for clearness of illustration, and parts broken away. Fig. 2 is a top plan view of the parts shown in Fig. 1 with certain of the parts removed for clearness of illustration. Fig. 3 is an enlarged detail showing the connection and control of one of the wings, parts being shown in section and parts being broken away for clearness of illustration. Fig. 4 is a top plan of the principal portion of the parts shown in Fig. 2. Fig. 5 is an end elevation of the parts shown in Fig. 3 taken from the line 5—5 of Fig. 3.

In the drawings I have shown my wind mill constructed to have the wings operate horizontally, but do not confine myself to that form as the wings may be mounted so as to rotate vertically instead of horizontally.

In the tower frame 10 of any approved construction is mounted the revoluble power shaft 11 which carries on the lower portion thereof bevel gear 12, which meshes with the bevel pinion 13 which is mounted on the driven shaft 14 from which power is taken to drive the driven machinery, not shown.

In the present application I have illustrated my mill as designed for pumping water, and have provided a crank 15 on the power shaft which is connected by a pitman rod 16 to the pump not shown. The power shaft projects upwardly from the tower frame and has secured thereto a plurality of radial power arms 17 of which there may be any desired number, there being preferably two or more of these arms. I have shown four, as I consider that number to be the best number for practical operation. These arms are secured together by the horizontal braces 18 and are also provided with top braces 19 which run to cap 20 mounted on the top of the power shaft. Rigidly secured to these arms and suspended therefrom are the vane frames 21. Brace rods 22 run from near the center of the bottom of these frames to the outer ends of the power arms 17. In the vane frames are vertically and pivotally mounted the vanes 23. In order to use lighter material in the construction of these vanes I divide the vane frame into upper and lower banks by cross bars 24 and 25 in which the lower ends of the upper bank and the upper ends of the lower bank are respectively pivoted. These vanes are preferably constructed of a blade 23$^a$ of sheet metal, which is wrapped at one edge around rod 23$^b$ which forms the axle or axis of the vane.

Rigidly secured to the central portion of each vane on the axial line are regulating arms 26 which project in a plane nearly parallel to the plane of the blade and have upturned ends which pass through the regulating frame 27, whereby when said frame is moved all of the vanes of that particular wing move in unison. The regulating frame has a vertical stiffening bar 28 which is connected by link bar 29 to piston stem 30. Piston stem 30 is connected to piston 31 which has a working fit in air cylinder 32 which is secured to the vane frame. Each vane frame is provided with a like piston. These pistons have outlet ports on the top thereof which are connected by pipes 33. Connected to any member of pipe 33 near the center of the mill is the suction pipe 34 which has on its outer end cock 35. Cock 35 has an operating arm 36 which passes through a slot 37 (best shown in Fig. 3) in an operating link 38 which is pivotally connected to one of the arms of the bell crank governor 39 which is pivoted at 40 to bearing 41 rigidly secured to the power shaft. A ball 42 is adjustably secured by means of set screw 43 upon the other arm of the governor so that whenever the motion of the vanes exceeds a predetermined limit the ball will swing away from the power shaft, thereby causing a partial or entire closure of the suction pipe. It will be observed that as long as the suction pipe is open the pistons in the air cylinders can freely move therein, but when the suction pipe is closed and the vanes are moved to their outermost position, that is in a position at right angles to the vane frame as best shown in Figs. 2 and 4, no air can enter the air cylinders and the vanes will be maintained in their open position. The air cylinders are also provided with ports controlled by outwardly opening check valves 44, through which the air can be expelled from the air cylinders after the suction pipe has been closed so that air may not be trapped in the cylinder by the closure of the suction pipe. The cock on the suction pipe is also provided with a second operating arm 45 which extends downwardly through slot 46 in the pitman bar 47 best shown in Figs. 3 and 4. This pitman bar is pivotally connected to a sleeve 48 which is revolubly mounted on the power shaft. The other end of pitman bar 47 is pivotally connected to one of the arms of the bell crank lever 49. The other arm of the bell crank lever is connected by chain 50 with a latch 51. This latch is pivoted at 52 to the vane frame. The regulating frame is provided with a notch 53 (see Fig. 3) into which the latch is adapted to drop when released which is accomplished manually by an operator standing upon the ground and pulling upon a rod 54 which is connected to the outer end of brake lever 55 which is pivoted at 56 on the upper end of the tower frame. The other end of the brake lever carries a brake shoe 57 which is brought into contact with sleeve 48 thereby retarding its motion so that pitman bar 47 operates bell crank lever 49 to pull the other arm downwardly and thereby permit latch 51 to drop into the notch in the regulating frame when it has reached its outward movement as best shown in Fig. 3. At the same time pitman bar 47 will operate handle 45 of cock 35 to close the suction pipe so that on the movement of the regulating frame to a release position the vanes are held both pneumatically and mechanically in their inoperative position or feathered. It will be understood that there are means at the bottom of the tower to lock the rod after the brake has been applied to the sleeve, and the vanes locked in their open position. When it is desired to throw the vanes into operation again the rod would be unlocked when spring 58 would return the sleeve back to its normal position, thereby carrying the latch out of engagement with the regulating frame. A weight 59 on arm 36 opens the cock on the suction pipe, whether the vanes are locked automatically or manually. By this means provision is made for automatically locking the vanes in their inoperative position and also for manually locking them in their inoperative position.

Having described my invention what I claim is:

1. In a wind turbine a revoluble power shaft; a plurality of radial wings rigidly secured to said shaft, each wing comprising an arm; a vane frame suspended from said arm; a plurality of vanes, pivotally mounted in said frame; an air cylinder rigidly secured to said vane frame; a piston in said air cylinder; a stem projecting from said piston through the outer end of said air cylinder, said air cylinder having ports at the inner end thereof; an outwardly opening check valve on one of said ports; a pipe leading upwardly from the other port and having its outlet controlled by a cock having an operating arm; a ball governor mounted on the upper end of the power shaft; a connection between said governor and the arm of the cock; a regulating frame; an operative connection from said regulating frame to each of the vanes; and a connection from said regulating frame to the piston stem of the air cylinder.

2. A wind turbine comprising a revoluble power shaft; a plurality of radial wings secured to said power shaft and forming the revolving means thereof, each wing having a plurality of vanes; a regulating frame operatively connected with said vanes; pneumatic means comprising an air cylinder having a vent port, a piston in said cylinder having a stem operatively connected to said regulating frame adapted to hold the regulating frame in a position to keep the vanes feathered whenever the vent port of said pneumatic means is closed; and means to close said vent port when desired.

3. In a wind turbine, a frame; a revoluble power shaft mounted in said frame; a plurality of radial wings rigidly secured to said shaft, each wing comprising an arm; a vane frame suspended from said arm; a plurality of parallel vanes pivotally mounted in said frame; an air cylinder rigidly secured to said vane frame; a piston in said air cylinder; a stem projecting from said piston through the outer end of said air cylinder, said air cylinder having ports at the inner end thereof; an outwardly opening check valve on one of said ports; a pipe leading upwardly from the other port; a cock on the outlet of said pipe, having an operating arm; a regulating frame having a notch in the upper part thereof; an operative connection from said regulating frame to each of the vanes; a connection from said regulating frame to the piston stem of the air cylinder; a latch pivotally mounted upon the vane frame and adapted when released to enter the notch in the regulating frame; a bell crank lever pivotally mounted on the vane frame above the latch; a sleeve revolubly mounted around the power shaft; a brake lever pivotally mounted upon the frame; means connected to one end to operate said lever; a brake shoe upon the other end of said lever and adapted to engage the sleeve; a pitman bar connected to said sleeve and to one arm of the bell crank lever; said bar having a slot therein through which the operating arm of the cock passes; a flexible connection from the other arm of the bell crank lever to the latch.

4. In a wind turbine, a frame; a revoluble power shaft mounted in said frame; a plurality of radial wings rigidly secured to said shaft, each wing comprising an arm; vane frames suspended from said arms; a plurality of parallel vanes pivotally mounted in said frames; a regulating frame having a notch in the upper part thereof; an operative connection from said regulating frame to each of the vanes; a latch pivotally mounted upon the vane frame, and adapted when released to enter the notch in the regulating frame; a bell crank lever pivotally mounted on the vane frame above the latch; a sleeve revolubly mounted around the power shaft; a brake lever pivotally mounted upon the frame; means connected to one end to operate said lever; a brake shoe upon the other end of said lever adapted to engage the sleeve; a pitman bar connected to said sleeve and to one arm of the bell crank lever; and a flexible connection between the other end of the bell crank lever and the latch.

In witness that I claim the foregoing I have hereunto subscribed my name this 15th day of November, 1909.

HENRY I. HAWXHURST.

Witnesses:
C. H. GATCHEL,
S. B. AUSTIN.